United States Patent [19]

Gross et al.

[11] Patent Number: 5,586,157
[45] Date of Patent: Dec. 17, 1996

[54] METHOD AND APPARATUS FOR MANUFACTURING GAS TAGS

[75] Inventors: Kenny C. Gross, Bolingbrook, Ill.; Matthew T. Laug, Idaho Falls, Id.

[73] Assignee: The University Of Chicago, Chicago, Ill.

[21] Appl. No.: 174,146

[22] Filed: Dec. 28, 1993

[51] Int. Cl.$^6$ .............................. G21C 3/02; G21C 17/04
[52] U.S. Cl. .......................... 376/260; 376/253; 376/463
[58] Field of Search .................................... 376/251, 253, 376/260, 463

[56] References Cited

U.S. PATENT DOCUMENTS

| | | | |
|---|---|---|---|
| 3,959,069 | 5/1976 | McCormick | 376/253 |
| 4,495,143 | 1/1985 | Gross et al. | 376/253 |
| 5,406,605 | 4/1995 | Gross | 376/463 |

OTHER PUBLICATIONS

Nuclear Technology, vol. 26, (Aug. 1975), pp. 472–479, Strand et al.
Nuclear Technology, vol. 74, (Nov. 1974), pp. 149–155, McCormick et al.
Nuclear Technology, vol. 50, (Aug. 1980), pp. 16–24, Figg et al.

*Primary Examiner*—Harvey E. Behrend
*Attorney, Agent, or Firm*—Emrich & Dithmar

[57] ABSTRACT

For use in the manufacture of gas tags employed in a gas tagging failure detection system for a nuclear reactor, a plurality of commercial feed gases each having a respective noble gas isotopic composition are blended under computer control to provide various tag gas mixtures having selected isotopic ratios which are optimized for specified defined conditions such as cost. Using a new approach employing a discrete variable structure rather than the known continuous-variable optimization problem, the computer controlled gas tag manufacturing process employs an analytical formalism from condensed matter physics known as stochastic relaxation, which is a special case of simulated annealing, for input feed gas selection. For a tag blending process involving M tag isotopes with N distinct feed gas mixtures commercially available from an enriched gas supplier, the manufacturing process calculates the cost difference between multiple combinations and specifies gas mixtures which approach the optimum defined conditions. The manufacturing process is then used to control tag blending apparatus incorporating tag gas canisters connected by stainless-steel tubing with computer controlled valves, with the canisters automatically filled with metered quantities of the required feed gases.

6 Claims, 4 Drawing Sheets

METHOD AND APPARATUS FOR MANUFACTURING GAS TAGS

CONTRACTUAL ORIGIN OF THE INVENTION

The United States government has rights in this invention pursuant to Contract No. W-31-109-ENG-38 between the U.S. Department of Energy and the University of Chicago representing Argonne National Laboratory.

FIELD OF THE INVENTION

This invention relates to a method and apparatus for manufacturing gas tags used in a gas tagging failure detection system for a nuclear reactor, and is particularly directed to a method and apparatus for selecting and optimizing gas tag mixtures and for filling gas tag canisters.

BACKGROUND OF THE INVENTION

A gas tagging failed fuel assembly detection system 10 is shown in simplified conceptual form in FIG. 1. Gas tagging for failed fuel identification in nuclear reactors involves the addition of a small amount of stable noble gas isotopes to the helium fill gas of each of the reactor's fuel rods 12. The same composition of tag gas isotopes is used in every rod 12 in a given fuel assembly 14, with the gas composition systematically varied from one assembly to the next throughout the nuclear reactor 16. When a fuel rod 12 fails, it releases a portion of its tag gas 11 into the reactor's primary coolant system 18. Using a mass spectrometer 20, the detection system 10 "sniffs" a small gas sample from the primary coolant system to determine the assembly (or assemblies) containing the leaking fuel rod(s).

Each gas tag has a specified isotopic composition in terms of the ratios of the constituent isotopes with respect to one another, or, equivalently, in terms of the mole percent of each constituent isotope. To produce a canister of tag gas with the desired isotopic composition, several canisters of feed gas from a commercial enriched-gas supplier are used. Each feed gas blend has a unique isotopic composition determined by the physical enrichment process (either thermal diffusion or gas centrifuge) used to enhance the abundance of the individual isotopes for each noble gas species. In general, there is a very wide range of costs for each available feed gas blend. The unit costs of feed gas blends can easily vary by three orders of magnitude between relatively low cost natural-abundance feed gases (whose mole percents are essentially the same as those which occur naturally in the air, requiring no enrichment) and more expensive highly enriched blends, which have high mole fractions of those isotopes characterized by low natural abundance.

For purposes of illustration, Table I shows a set of eight hypothetical feed gas mixtures, each of which comprises four isotopes. The isotopic compositions for each feed gas are typical of those obtainable from an enriched-gas supplier by thermal diffusion, and the range of costs is typical of the costs for enriched stable noble gases. While Table I contains information relating to the gas blending procedure for eight hypothetical four-component feed gases, the method discussed herein is applicable to virtually any number of feed gas mixtures comprising any number of constituent components.

TABLE I

| Feed Gas Mixture No. | Mole % | | | | Cost $/L |
|---|---|---|---|---|---|
| | Isotope 1 | Isotope 2 | Isotope 3 | Isotope 4 | |
| 1 | 10 | 35 | 15 | 40 | $800 |
| 2 | 20 | 30 | 12 | 38 | 1350 |
| 3 | 30 | 27 | 11 | 32 | 2100 |
| 4 | 40 | 24 | 16 | 20 | 3400 |
| 5 | 50 | 20 | 20 | 10 | 5500 |
| 6 | 60 | 15 | 15 | 10 | 6800 |
| 7 | 70 | 12 | 8 | 10 | 9500 |
| 8 | 80 | 6 | 6 | 8 | 11200 |

Costs and Enrichments for Eight Sample Feed Gas Mixtures

There are a fixed number of noble gas isotopic mixtures commercially available which encompass a wide range of costs. To obtain a target composition for a desired gas tag, there are infinitely many ways to blend the eight available feed gases and produce the required isotopic mole percents. These blends span a very large range of costs. A non-trivial optimization problem arises when the objective is to find which combination of eight or less input gases produces the minimum overall tag cost, while satisfying the analytical constraints imposed by the target isotopic ratios and the physical constraint that the proportion of each feed gas must be non-negative.

The prior art in this area employs two approaches for solving the tag-blend optimization problem, each of which has limitations when employed in a commercial production-scale operation. One approach, developed at the Experimental Breeder Reactor-II (EBR-II) at Argonne National Laboratory in the early 1970's, involves computing a graphical control chart capable of accommodating only three feed gases and minimizing the use of the most expensive isotope. An example of this control chart for EBR-II's xenon gas tags is shown in graphic form in FIG. 2. This control-chart approach was relatively convenient at the time it was devised before the advent of personal computers, but produced tag-blends that were suboptimal with respect to cost. The cost penalties estimated by comparing control-chart blends with blends obtained from optimization techniques described below, averaged 30% of the tag cost when the same three fuel gas blends are used. This is not a severe penalty for a small research reactor such as EBR-II, but results in sizable economic penalties for a commercial type reactor involving the use of as many as $10^5$ pins per core where the cost difference per pin may be as great as $2.00.

A second prior art attempt at tag-blend optimization involves a computer implementation of a detailed analytical solution to the constrained optimization problem which suffers from computational complexity. In this approach, a problem involving ten feed gases with five analytical constraints is mapped onto a system of 15 nonlinear simultaneous equations, which is transformed into a system of 15 linear simultaneous ordinary differential equations (ODEs). One difficulty in this approach is that the solution requires an input "guess" of the solution vector. For constrained optimization problems of this nature, there are very many widely separated local minima and there is no way, a priori, to select a starting vector that will ensure convergence to the overall global minimum. To avoid this difficulty prior approaches sought to supply a very large number of starting-guess vectors and solve the complete system of 15 ODEs for all starting vectors. This approach, which requires a large supercomputer to blend a small system of tags, would not be practical for a large scale commercial operation.

Still another problem with prior art approaches to tag gas manufacture involves the actual physical procedure employed in blending the tags after a blend composition is determined by one of the procedures discussed above. The blending process entails manual connection and disconnection of gas cylinders, and opening and closing of a complex system of valves connecting purge lines, feed-gas lines, vacuum lines and compressor lines. This procedure is lengthy, manpower intensive, error prone, wasteful of gas, and laborious for the gas chemist.

The present invention addresses the aforementioned limitations of the prior art by determining the most cost-effective isotopic mixtures for nuclear reactor gas tags for computer controlling the mixing of the isotopes from a number of filling gas canisters to a single blended tag canister. The latter is used to fill a fuel pin with a tag of that composition, thereby providing it with a unique identity to permit detection of a leak from a given pin and allow for identification of the leaking pin, or pins.

OBJECTS AND SUMMARY OF THE INVENTION

Accordingly, it is an object of the present invention to provide a computerized system and method for manufacturing gas tags for use in gas tagging failure detection in a nuclear reactor.

It is another object of the present invention to provide an improved method and apparatus for selecting gas tag mixtures for filling tag gas canisters in a nuclear reactor which minimizes the wastage and thus the cost of expensive feed gases and essentially eliminates the possibility of human error in the filling of the canisters.

Yet another object of the present invention is to provide a system and method which determines the cost difference between multiple combinations of feed gases used to fill tag gas canisters for use in a nuclear reactor gas tagging failure detection system and, under computer control, precisely regulates the amount of each feed gas provided to each canister to provide an optimum blend of M tag gas isotopes and N distinct feed gas mixtures.

A further object of the present invention is to automatically fill a plurality of gas canisters for use in a nuclear reactor gas tagging failure detection system using a single manifold with a plurality of computer controlled valves, where each valve meters a feed gas provided to each canister.

These objects of the present invention are achieved and the disadvantages of the prior art are eliminated by a method for blending a plurality of N feed gas mixtures in forming a tag gas for use in gas tagging failure detection in a nuclear reactor, wherein each feed gas is comprised of M tag isotopes, the method comprising the steps of: (a) providing a first initial state vector $F(1)$ having N components representing the composition of a target gas, wherein each of the N components has an associated cost; (b) determining the $COST(i)$ of $F(1)$; (c) randomly perturbing components of $F(1)$ to provide a second state vector $F(j)$ and determining the $COST(j)$ of $F(j)$; (d) comparing $COST(i)$ with $COST(j)$ and changing components of $F(j)$ in a stepwise manner in reducing $COST(j)$ if $COST(j)$ exceeds $COST(1)$ until $COST(1) \geq COST(j)$ (decremented); (e) accepting $F(j)$ (decremented) as a current state; (f) randomly perturbing components of $F(j)$ (decremented) and repeating steps (c) through (e) until $COST(n)$ of a final state vector $F(n)$ is minimized; and (g) providing N feed gases to a blended tag canister in accordance with the composition of the final state vector $F(n)$.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
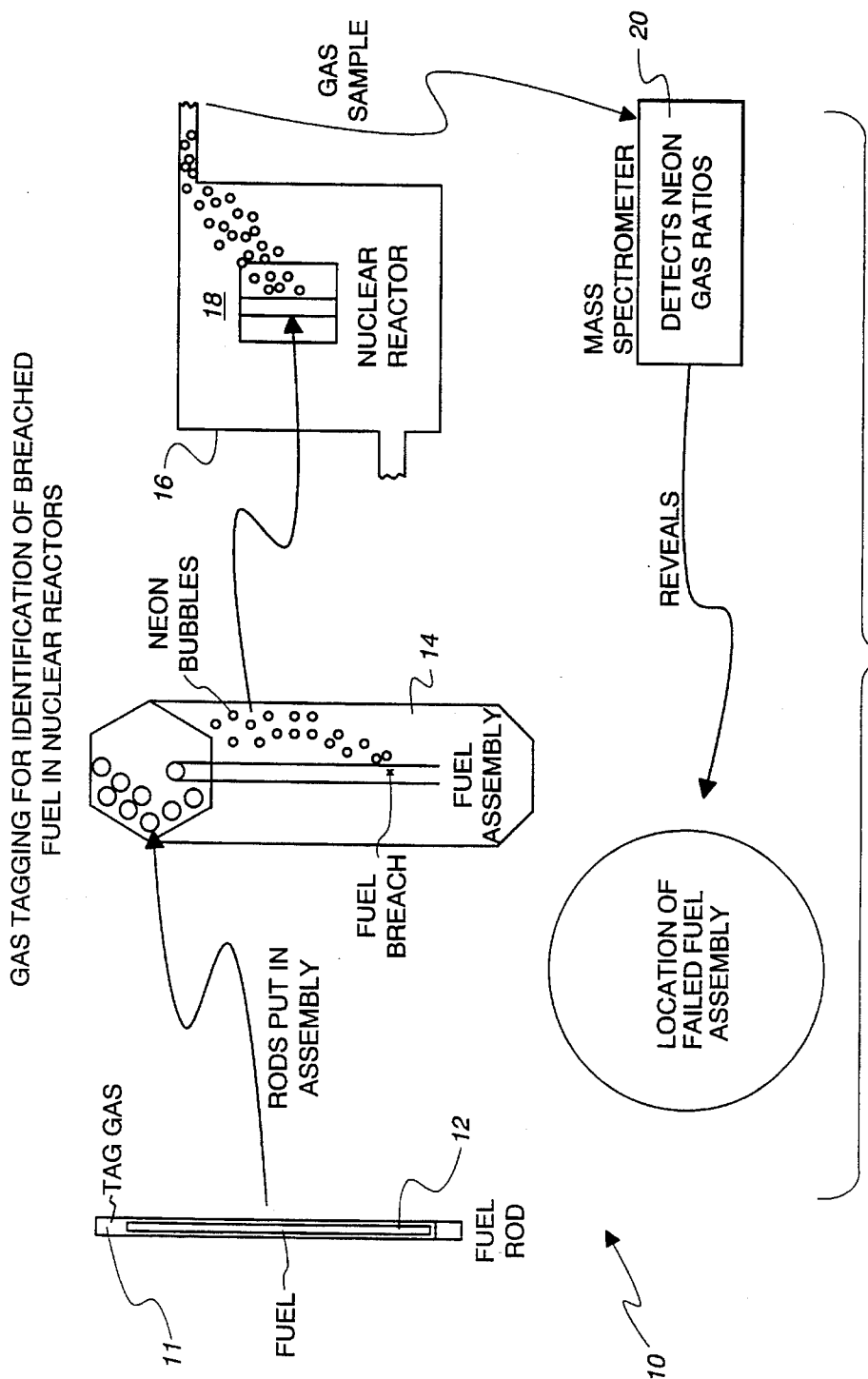
FIG. 1 is a simplified conceptual illustration of gas tagging failure detection in a nuclear reactor.
Figure 2:
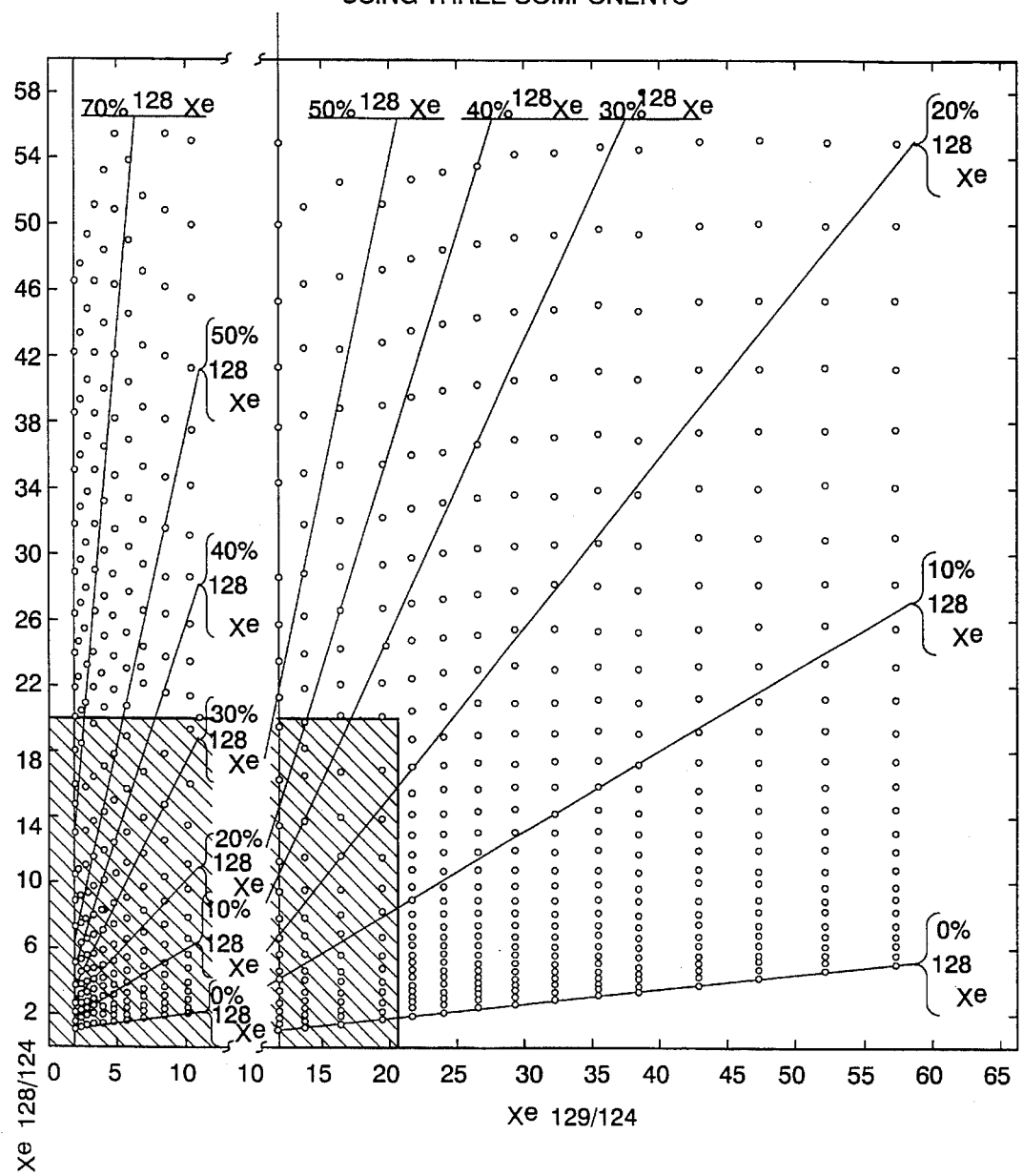
FIG. 2 is a graphic representation of a prior art control chart used in blending three feed gases in producing xenon gas tags.
Figure 3:
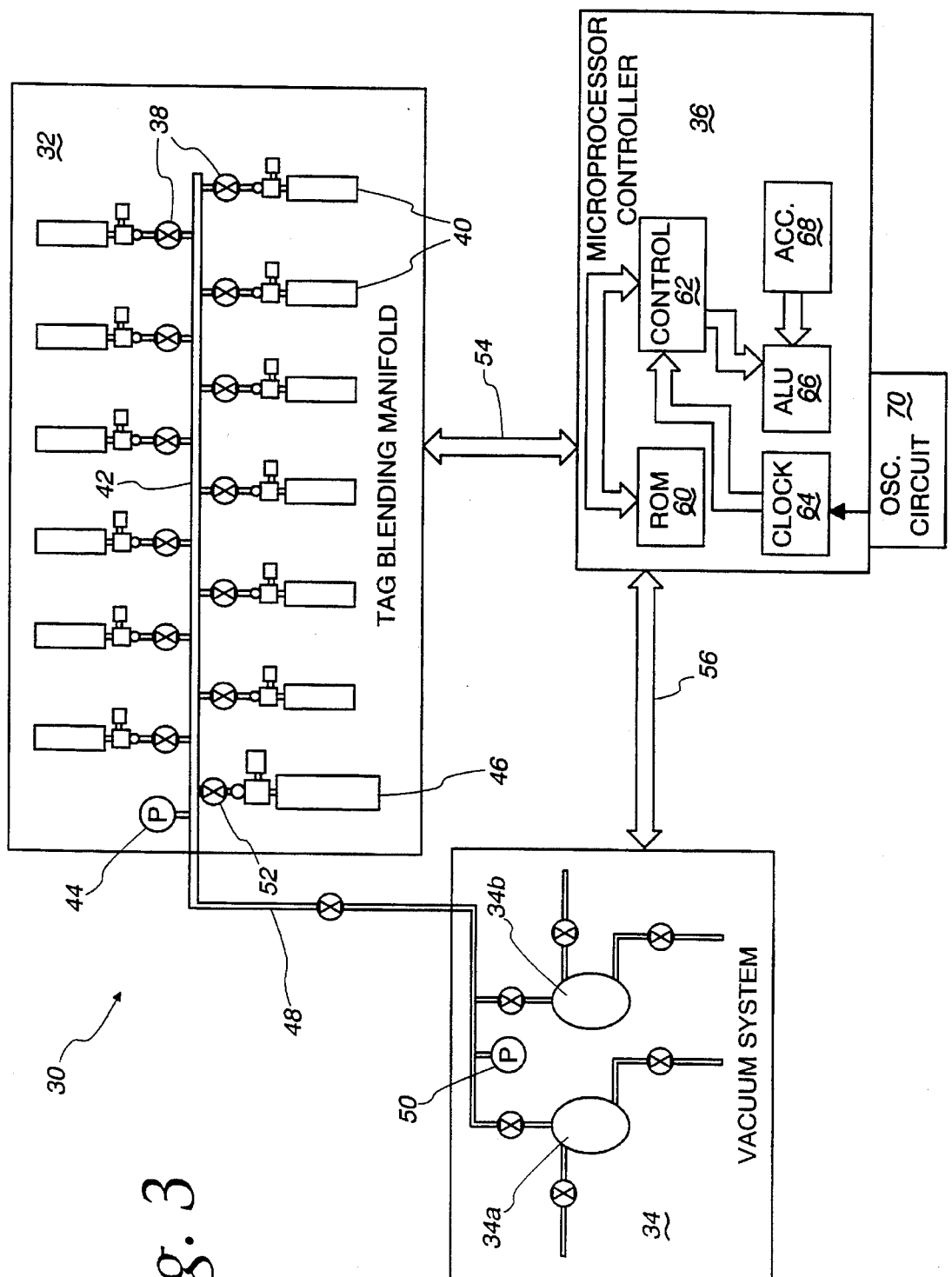
FIG. 3 is a simplified schematic diagram of gas tag manufacturing apparatus in accordance with the present invention.

Referring to FIG. 3, there is shown a simplified schematic diagram of a tag gas blending system 30 in accordance with the principles of the present invention. Tag gas blending system 30 includes a tag blending manifold 32, a vacuum system 34 and a microprocessor-based controller 36. Tag blending manifold 32 includes a stainless steel manifold 42 to which are coupled a plurality of filling gas cylinders, or canisters, 40. Each of the filling gas cylinders 40 is coupled to the tag blending manifold 32 by means of a respective computer-controlled valve 38. Each of the valves 38 is coupled to and controlled by microprocessor controller 36 for opening and closing each of the individual valves and connecting its associated gas cylinder 40 to manifold 42. Microprocessor controller 36 is coupled to the tag blending manifold 32 by means of a first control/communication bus 54 by means of which control signals are provided from the microprocessor controller to each of the valves 38 and also by means of which status signals relating to each of the valves is provided to the microprocessor controller. Each of the filling gas cylinders 40 contains a feed gas having a specified composition. Manifold 32 couples each of the filling gas cylinders 40 to a blended tag canister 46 for filling the blended tag canister with metered quantities of each of the feed gases in the filling gas cylinders 40. The metering is accomplished by means of microprocessor controller 36 which also is coupled to a tag gas canister valve 52 to allow for introduction into the blended tag gas canister 46 of the required feed gases to provide a tag gas having a designated composition.

Vacuum system 34 is coupled by means of a vacuum line 48 to manifold 42 within the tag blending manifold 32. A first pressure transducer 44 is coupled to manifold 42 in the tag blending manifold 32, while a second pressure transducer 50 is coupled to vacuum line 48 within vacuum system 34. Vacuum system 34 is further coupled to microprocessor controller 36 by means of a second control/communication bus 56. Microprocessor controller 36 controls the operation of vacuum system 34 in forming a vacuum within manifold 42 in drawing various of the feed gases within the filling gas cylinders 40 into the blended tag canister 46. Various valves are shown in the vacuum system 34 to prevent escape of the feed gases from the tag gas blending system 30. Vacuum system 34 includes two pumps 34a and 34b for redundancy for drawing feed gases from the filling gas cylinders 40 into the blended tag canister 46 via manifold 42. In a typical tag gas blending system, M tag isotopes for N distinct feed gas mixtures commercially available from an enriched gas supplier are used to fill blended tag canister 46 with a tag gas having a designated composition. The procedure typically involves opening one of the valves connected to one of the filling gas cylinders, drawing off a predetermined amount of feed gas, closing the valves to the filling gas cylinder as well as to the blended tag canister, and purging the gas line before introducing another feed gas to the blended tag canister in forming the tag gas blend.

Controller 36 includes a ROM 60, a clock 64, an accumulator (ACC) 68, a controller 62 and an arithmetic and logic unit (ALU) 66. Microprocessor controller 36 stores instructions and data, periodically updates the stored data, compares both stored and real-time data and makes decisions based upon these comparisons by means of logic instructions in providing control for the tag gas blending system 30. An oscillator circuit 70 external to the microprocessor controller 36 provides timing signals to clock 64 for controlling the timing of operations carried out by the microprocessor controller. Program instructions and data are stored in ROM 60. These program instructions and data are described in terms of a flow chart shown in FIG. 4 in describing the operation of the tag gas blending system.

Figure 4:
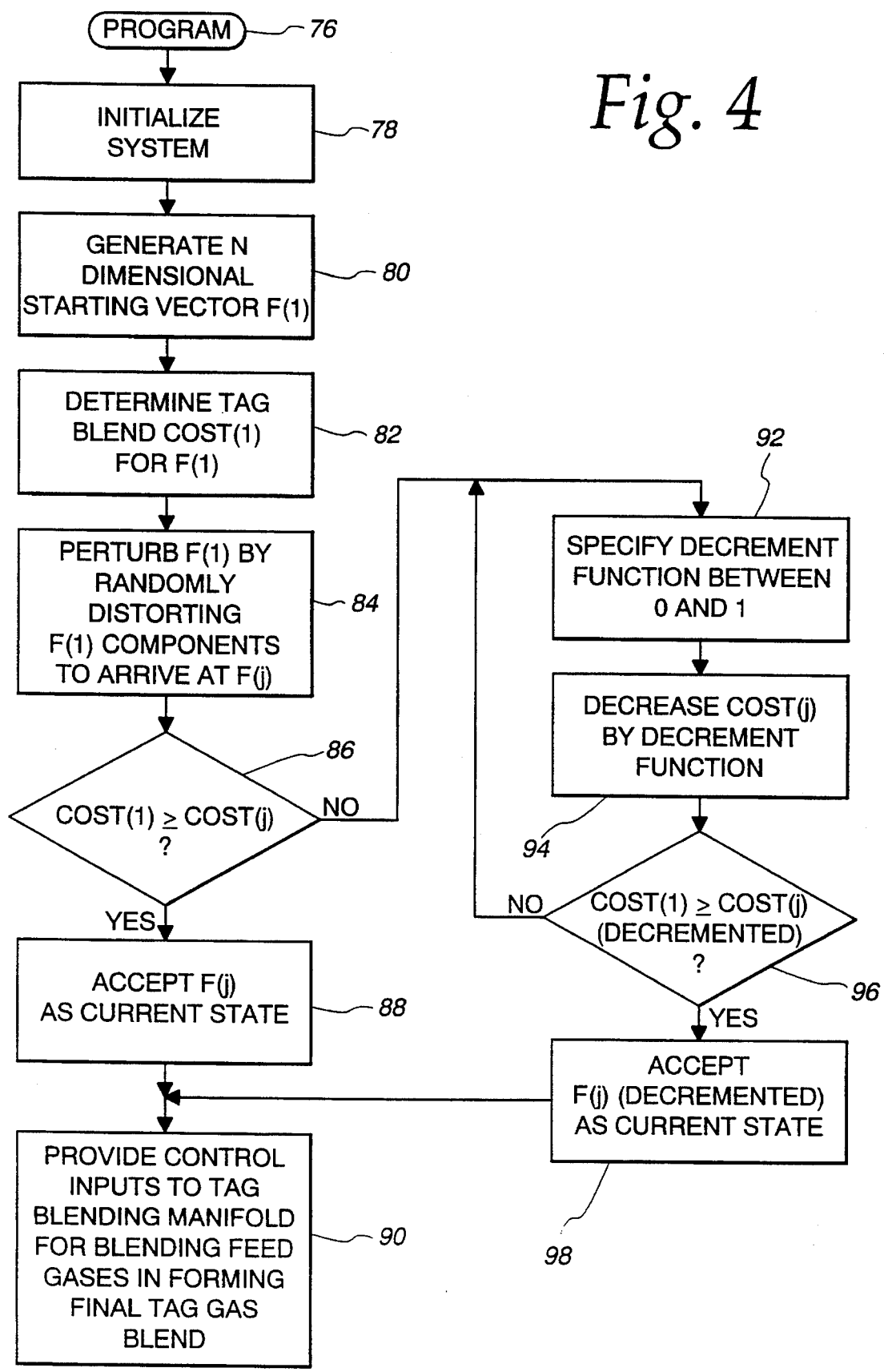
FIG. 4 is a flow chart illustrating the sequence of steps carried out in accordance with the method for manufacturing gas tags of the present invention.

Referring to FIG. 4, there is shown a flow chart illustrating the operation of the tag gas blending system 30 of the present invention under the control of microprocessor controller 36. In FIG. 4, an oval symbol indicates the start of an operational sequence, a rectangle indicates an instruction or set of instructions resulting in the performance of a control function, and a diamond indicates a decision based upon the comparison of binary signals within the microprocessor controller 36.

The present invention employs a simulated annealing algorithm which is described in general terms in the September, 1989 edition of *Dr. Dobb's Journal,* in an article entitled "Simulated Annealing" pages 26–37. This article is hereby incorporated by reference in the present application. Simulated annealing algorithms employ combinatorial optimization by taking a finite number of indivisible "objects" and arranging them in a configuration that is "best" according to some stipulated criteria. The stipulated criteria in the present invention is minimum cost of the blended tag gas. A simulated annealing analogy is made with a process employed in the fabrication of objects constructed of metal or glass, where regions of stress have relatively high energy which leads to instability. The present approach replaces the concept of energy with cost and applies the criteria of minimizing the cost of the tag gas composition. This approach employs perturbations in the form of random changes to the current configuration of the cost system and then compares the new cost with the initial cost. The goal is to reach a minimum cost, with the size of the perturbations decreasing in magnitude as the minimum cost is approached. Perturbations are made to new cost vectors following perturbation of a current cost vector even when the new cost vector represents a cost reduction in order to avoid local cost minima and reach a global cost minimum.

At step 76 in the operation of the program stored in microprocessor controller 36, the program for manufacturing gas tags in accordance with the present invention is initiated. At step 78, the microprocessor controller 36 is initialized by resetting its control flags to an initial set of conditions whereupon the microprocessor controller is ready for controlling the tag gas blending system 30 in accordance with the present invention. Microprocessor controller 36 has previously been programmed in a conventional manner to carry out the control and monitoring functions described in the following paragraphs.

The program then proceeds to step 80 and generates a random N dimensional starting vector $F(1)$, whose N components are the blending fractions of the N feed gases that produce the desired target tag composition. In the present case, it is assumed that an enriched gas supplier offers N commercially available feed gas mixtures, each of which comprises M tag isotopes. The step of generating a random N dimensional starting vector, $F(1)$, is achieved by providing uniform random numbers for N-2 of the components, or feed gas mixtures, then solving for the remaining two components subject to the following two constraints: (a) the target tag compositions are achieved, and (b) the final normalized elements of $F(1)$ sum to unity. A tag-blend cost for $F(1)$ is then determined at step 82 by calculating the cost of each of the components of $F(1)$ and adding these component costs to arrive at the total cost, COST(1), of $F(1)$.

$F(1)$ represents the initial state of the solution vector. Subsequent states of the solution vector are obtained by applying a perturbation mechanism which transforms the previous state into the next state by a small random distortion of the components of $F(1)$. For example, if the cost associated with state i is COST(i), and the cost of the next state is COST(j), then the following relaxation rule is imposed: If the cost difference COST(i) minus COST(j), is greater than or equal to 0, the state $F(j)$ is accepted as the current state. If the cost different is less than 0, the state $F(j)$ is accepted with a certain probability which is given by the following:

$$\exp\left(\frac{cost(i) - cost(j)}{C(j)}\right) \quad (1)$$

where $C(j)$ is a control parameter that determines the relaxation time for the present method. See Aarts, E. and Korst, J., *Simulated Annealing and Boltzman Machines,* Wiley (1989), for a discussion of relaxation constants in simulated annealing algorithms, which text is hereby incorporated by reference in the present application. Thus, at step 84 the initial state of the solution vector $F(1)$ is perturbed by randomly distorting $F(1)$ components to arrive at $F(j)$. In a preferred embodiment, a large initial value for the first element of C, $C(1)$, is specified. The numeric value selected for $C(1)$ depends upon the gases which make up the N feed gases which are to be blended. $F(1)$ is initially subjected to large perturbations in order to more quickly exit a local minimum in an effort to reach a global minimum. The size of the changes in the components of $F(1)$ decrease with time as a global minimum is approached. The rate at which the magnitude of the perturbations of the components of $F(1)$ change, or the relaxation time, is determined by the $C(j)$ control parameter.

After randomly perturbing the components of $F(1)$ and arriving at a new solution vector $F(j)$, the program at step 86 then compares COST(1) with COST(j) at step 86. If it is determined at step 86 that the cost of the current state is less than the cost of the initial state $F(1)$, the program accepts $F(j)$ as the current state at step 88. The program then at step 90 causes the microprocessor controller 36 to provide appropriate control inputs via the first control/communication bus 54 to the tag blending manifold for blending the feed gases in forming the final tag gas blend in the blended tag canister 46.

If at step 86 it is determined that the cost of the current state F(j) is not less than or equal to the cost of the initial state F(1), the program proceeds to step 92 and specifies a decrement function between 0 and 1. The program starts by specifying a large initial value for the first element of C, C(1), as shown in Eq. 1. The numeric value selected for C(1) depends upon the feed gases to be blended for forming the tag gas. The program then specifies a decrement function given by C(k+1)=αk, k=1, 2, . . . , where α is a decrement coefficient between 0 and 1. A small value of α accelerates the relaxation process, but can get "stuck" in local minima. It has been found that a decrement coefficient of α=0.9 provides a satisfactory relaxation time with convergence to an acceptable neighborhood of the global minimum for cost.

After specifying the decrement function at step 92, COST(j) is decreased by the decrement function at step 94, with the new decremented COST(j) then compared with COST(i) at step 96. If at step 96 it is determined that the decremented COST(j) is less than or equal to COST(1), the program proceeds to step 98 and accepts the decremented COST(j) as the current state. If at step 96 it is determined that the decremented COST(j) is not less than or equal to COST(1), the program then returns to step 92 and again specifies a decrement function between 0 and 1 in a loop which continues until the decremented COST(j) is less than or equal to COST(I), whereupon the program branches to step 98 in accepting the new cost as the current state for providing appropriate control inputs to the tag blending manifold for blending feed gases in forming the final tag gas blend at minimum cost at step 90.

There has thus been shown a computer-controlled method and apparatus for manufacturing gas tags for use in a gas tag failure detection system for a nuclear reactor. A plurality of commercial feed gases each having a respective noble gas isotopic composition are blended under computer control to provide various tag gas mixtures having selected isotopic ratios which are optimized for specified defined conditions such as cost. A simulated annealing method is employed for considering the blending of M tag isotopes with N distinct feed gas mixtures commercially available from an enriched gas supplier and each having a specified cost, to calculate the cost difference between multiple combinations of feed gas mixtures in determining the minimum cost. The manufacturing process is then used to control a tag blending apparatus incorporating tag gas canisters connected by stainless-steel tubing with computer-controlled valves, with the canisters automatically filled with metered quantities of the required feed gases, which combinations produce tag gases of minimum cost.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method for blending a plurality of N feed gas mixtures in forming a tag gas for use in gas tagging failure detection in a nuclear reactor, wherein each feed gas is comprised of M tag isotopes, said method comprising the steps of:

(a) providing a first initial state vector F(1) having N components representing the composition of a target gas, wherein each of said N components has an associated cost;

(b) determining the COST(1) of F(1);

(c) randomly perturbing components of F(1) to provide a second state vector F(j) and determining the COST(j) of F(j);

(d) comparing COST(1) with COST(j) and changing components of F(j) in a stepwise manner in reducing COST(j) if COST(j) exceeds COST(1) until COST(1)≧COST(j) (decremented);

(e) accepting F(j) (decremented) as a current state;

(f) randomly perturbing components of F(j) (decremented) and repeating steps (c) through (e) until COST(n) of a final state vector F(n) is minimized; and (g) providing N feed gases to a blended tag canister in accordance with the composition of said final state vector F(n).

2. The method of claim 1 wherein the step of randomly perturbing components of F(1) includes randomly perturbing N-2 feed gas components of F(1) followed by determining the remaining two feed gas components.

3. The method of claim 1 wherein the components of F(j) are initially changed in large steps followed by smaller steps in reducing COST(j).

4. The method of claim 3 wherein, if COST(i)<COST(j), F(j) is accepted as the current state with a probability given by $$\exp\left(\frac{cost(i) - cost(j)}{C(j)}\right)$$

where
   COST(i)=cost of initial state,
   COST(j)=cost of state F(j), and
   C(j)=control parameter determining relaxation time.

5. The method of claim 4 wherein C(j) is specified as a decrement function given by C(k+1)=αk, k=1, 2, . . . , where 0<α<1.

6. The method of claim 5 where α=0.9.

* * * * *

UNITED STATES PATENT AND TRADEMARK OFFICE
CERTIFICATE OF CORRECTION

PATENT NO. : 5,586,157
DATED : December 17, 1996
INVENTOR(S) : Kenny C. Gross

It is certified that error appears in the above-indentified patent and that said Letters Patent is hereby corrected as shown below:

Column 8,

Claim 4, line 1, COST(i) should be --COST(1)--.

Signed and Sealed this

Twenty-ninth Day of April, 1997

*Attest:*

BRUCE LEHMAN

*Attesting Officer*     *Commissioner of Patents and Trademarks*